No. 770,389. Patented September 20, 1904.

UNITED STATES PATENT OFFICE.

WALTER RÜBEL, OF BERLIN, GERMANY, ASSIGNOR OF ONE-HALF TO NATHAN BERNSTEIN, OF BERLIN, GERMANY.

MANUFACTURE OF ALUMINIUM.

SPECIFICATION forming part of Letters Patent No. 770,389, dated September 20, 1904.

Application filed July 7, 1902. Serial No. 114,670. (No specimens.)

*To all whom it may concern:*

Be it known that I, WALTER RÜBEL, manager, a subject of the King of Prussia, German Emperor, and a resident of 77 Petersburgerstrasse, Berlin, Kingdom of Prussia, German Empire, have invented certain new and useful Improvements in the Manufacture of Aluminium, of which the following is an exact specification.

This invention relates to a process for manufacturing aluminium by smelting without using an electric current.

For carrying the process into effect clay is used, which must be as pure as possible—that is to say, which must consist as much as possible of aluminium silicate. The clay is at first made red-hot at a temperature of about 1,800° Celsius, then ground and mixed with a sulfur containing compound of calcium, such as gypsum or the like, or with a mixture by means of which such a compound is produced—such as, for instance, a mixture of phosphate of calcium (or a substance containing phosphate of calcium) and sulfuric acid. To this mixture a substance is added effecting the exclusion of the air from the surface of the mixture and containing carbon—such as, for instance, mineral oil, coal-dust, waste mineral oil, (residuum,) or other similar substances. The mixture is put into a crucible or retort and is exposed to a temperature of between 1,000° and 2,000° centigrade after the air has been excluded, which may be done, for instance, by covering the mixture with coal-dust, by a reducing-flame, or the like. The time during which the mixture is exposed to the high temperature depends upon the quantity of the mixture and amounts to about one-half to two hours. After congealing the contents of the crucible or retort consists of two layers. At the bottom of the crucible or retort is molten metal, and this is covered by a layer of slags, which slags are mostly not molten together, but are powdery. The aluminium metal so obtained contains sometimes more or less phosphates and sometimes also silicate taken up from the walls of the crucible.

In order to obtain a very pure aluminium, it is smelted again with lime, or lime is immediately added to the mixture while still in the molten condition.

The process may be carried out in the following manner by way of an example: Four kilograms of burnt clay, seven hundred grams of bone-black, (a substance containing phosphate of calcium,) six hundred grams of sulfuric acid, (60° Baumé,) six hundred cubic centimeters of mineral oil, and in case a very pure aluminium is to be manufactured two kilograms of lime are mixed and are heated about three-quarters of an hour to a bright cherry-red heat. The powdery substance situated on top is then removed, and the metal is cast.

It will be clear that the metal may also be removed without taking away the slag on top of the same by arranging a tap-hole at the bottom of the crucible or retort, which tap hole can be opened, so that the metal can flow out.

The reactions taking place in the process are the following: The mixture of aluminium silicate and calcium sulfid undergoes a reaction by the heating, the result of which reaction consists of aluminium sulfid and calcium silicate. This reaction takes place much quicker in the presence of phosphoric acid, which most probably serves the purpose of breaking up the structure of the calcium sulfid. The aluminium sulfid so resulting combines with the carbon, and the result of this reaction consists of pure aluminium and bisulfid of carbon. The reaction takes place according to the following chemical equation:

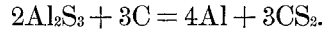
$$2Al_2S_3 + 3C = 4Al + 3CS_2.$$

Having thus fully described the nature of this invention, what I desire to secure by Letters Patent of the United States is—

1. The process of manufacturing aluminium, consisting in mixing clay with a sulfur containing compound of calcium, and a substance containing carbon, and heating the mixture to a bright cherry-red heat, substantially as described and for the purpose set forth.

2. The process of manufacturing aluminium, consisting in mixing clay with phosphate of calcium, sulfuric acid and a substance containing carbon, and heating the mixture to a bright cherry-red heat, substantially as described and for the purpose set forth.

3. The process of manufacturing aluminium, consisting in mixing clay with phosphate of calcium, sulfuric acid, lime, and a substance containing carbon, and heating the mixture to a bright cherry-red heat, substantially as described and for the purpose set forth.

In testimony whereof I have signed my name to this specification in the presence of two subscribing witnesses.

WALTER RÜBEL.

Witnesses:
WOLDEMAR HAUPT,
HENRY HASPER.